United States Patent [19]
Hausman

[11] Patent Number: 5,992,146
[45] Date of Patent: Nov. 30, 1999

[54] VARIABLE RATE RIDE CONTROL SYSTEM

[75] Inventor: Dennis J. Hausman, Peoria, Ill.

[73] Assignee: Caterpillar Inc., Peoria, Ill.

[21] Appl. No.: 08/631,398

[22] Filed: Apr. 12, 1996

[51] Int. Cl.⁶ .................................................. F16D 31/02
[52] U.S. Cl. .................................. 60/413; 60/469; 60/494
[58] Field of Search ............................. 60/413, 469, 494, 60/468

[56] References Cited

U.S. PATENT DOCUMENTS

| | | | |
|---|---|---|---|
| 4,220,004 | 9/1980 | Abeille et al. | 60/413 |
| 4,674,280 | 6/1987 | Stuhr | 60/413 |
| 4,738,101 | 4/1988 | Kubik | 60/413 |
| 5,034,892 | 7/1991 | Saotome | 364/424 |
| 5,333,533 | 8/1994 | Hosseini | 91/361 |
| 5,394,991 | 3/1995 | Kumagai et al. | 209/212 |
| 5,520,499 | 5/1996 | Ufheil et al. | 60/413 X |
| 5,611,199 | 3/1997 | Bray | 60/413 X |

FOREIGN PATENT DOCUMENTS 58-121305  7/1983  Japan.

*Primary Examiner*—Hoang Nguyen
*Attorney, Agent, or Firm*—J. W. Burrows

[57] ABSTRACT

In machines having a bucket that is capable of carrying a load of material, it is well known that when the machine encounters a bump or other obstacle that the effects thereof may result in a shock or jolt being subjected to the machine due to the sudden change in forces acting on the actuator of the lift mechanism. In the subject invention, an accumulator arrangement is connected through a first valve mechanism to the loaded end of an actuator to provide a cushion or damping of the sudden changes in the forces. The first valve mechanism controls the magnitude of the damping in response to the rate of flow between the actuator and the accumulator arrangement. This is accomplished by sensing the pressure drop across a flow restriction mechanism located upstream of the first valve mechanism and controlling the degree of fluid communication between the actuator and the accumulator arrangement in response thereto.

8 Claims, 2 Drawing Sheets

VARIABLE RATE RIDE CONTROL SYSTEM

TECHNICAL FIELD

This invention relates generally to a ride control system for use on a machine and more particularly to a variable rate ride control that is self adjusting in response to system shocks.

BACKGROUND ART

It is well known that when a machine, such as, for example, a wheel loader, is being driven for a distance with a loaded bucket there is always the possibility that the machine will be subjected to shocks due to the weight of the loaded bucket reacting to the machine encountering bumps or other obstacles in its pathway. In order to help reduce or eliminate shocks, it is known to use accumulators that are selectively connected to the lift cylinder actuator. These accumulators, when connected to the loaded end of the actuators, serve to absorb the pressure fluctuations in the actuators thus offsetting the changing forces that would otherwise be acting on the various components of the machine. It is these changing forces acting on the machine that produces the shocks. In order to maintain a pre-charge in the accumulator equal to the pressure in the loaded end of the actuators, it is known to connect the accumulator, during normal use, to the loaded end of the lift cylinder actuator. This is normally accomplished by connecting a conduit therebetween. The conduit normally has an orifice therein that is selectively disposed in the conduit when the machine is not operating in the ride control mode. When the ride control system is active, the load supporting end of the cylinder is in free communication with the accumulator in order to absorb the changing forces. It has been found in at least some situations that the degree of damping during ride control should be varied based on the magnitude of the shock to the machine.

The present invention is directed to overcoming one or more of the problems as set forth above.

Disclosure of the Invention

In one aspect of the present invention, a ride control system is provided for use on a machine having a frame with a lift mechanism operative through an actuator to raise a bucket relative to the frame. The actuator has first and second ports and is operative to raise and lower the bucket in response to pressurized fluid being selectively directed to and from the respective ports thereof from a directional control valve that is connected to a source of pressurized fluid and a reservoir. An accumulator arrangement is operatively connected to the first port of the actuator. The ride control system comprises a first valve mechanism operatively disposed between the accumulator arrangement and the first port of the actuator. The first valve mechanism has a spring biased end and a pressure responsive end and is movable from a spring biased first position at which communication is controllably permitted from the accumulator arrangement to the first port of the actuator towards a second position at which open communication therethrough is permitted. A flow restriction mechanism is provided and disposed in the fluid conduit between the first valve mechanism and the first port of the actuator. A first signal conduit is connected to the fluid conduit at a point between the flow restriction mechanism and the first port of the actuator and to the pressure responsive end of the first valve mechanism. A second signal conduit is connected to the fluid conduit at a point between the flow restriction mechanism and the first valve mechanism and the spring biased end of the first valve mechanism. A pilot valve mechanism is operatively disposed in the first pilot signal conduit and operative to selectively control fluid flow through the first pilot conduit. The pilot valve mechanism is movable between a spring biased first position at which the flow through the first signal pilot conduit is blocked and a second position at which the flow therethrough is open. The pilot valve mechanism is movable to the second position in response to receipt of an external signal.

The intent of the subject invention is to provide a ride control system that is effective to eliminate or at least substantially reduce shock loads to the machine. The shocks loads being subjected to the machine varies and are due to varying ground speeds, terrain and bucket load. It is desirable to damp the shock loads in portion to the magnitude of the shock load which is sensed by the rate of flow between the actuator and the accumulator.

BEST MODE FOR CARRYING OUT THE INVENTION

Figure 1:
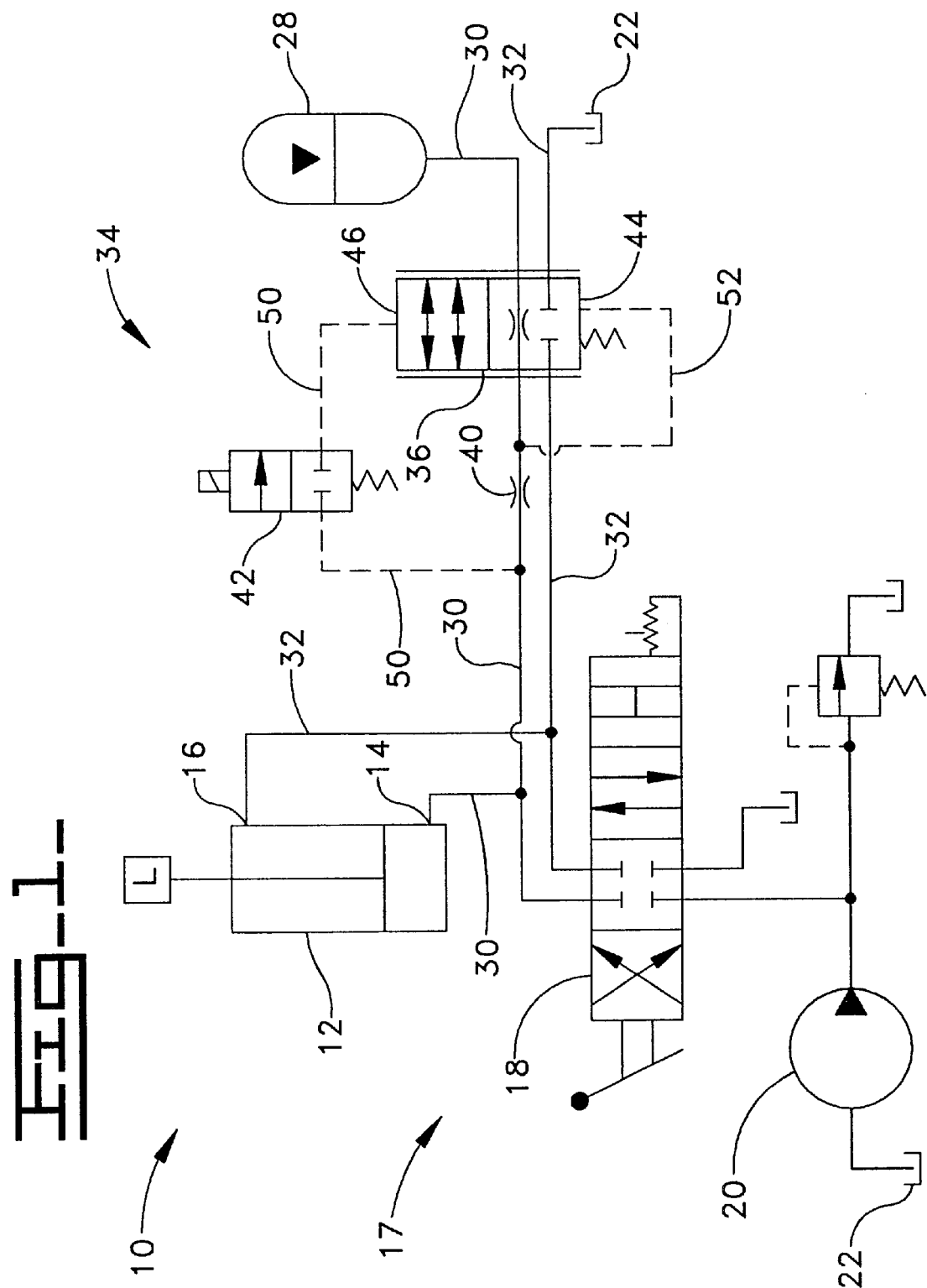
FIG. 1 is a schematic representation of a machine control system incorporating an embodiment of the subject invention.

Referring to the FIG. 1 of the drawings, a control system 10 is illustrated for use on a machine (not shown) having a lift mechanism for controlling movement of a bucket or the like. An actuator, such as a lift actuator 12, having first and second ports 14,16 controls the raising and lowering of the bucket. The control system 10 also includes a first fluid circuit 17 having a first directional control valve 18 operative to control movement of the lift actuator 12, a source of pressurized fluid, such as a pump 20, and a reservoir 22 that serves as the source of fluid for the pump 20 and as a container for the fluid returned from the lift actuator 12. The directional control valve 18 is illustrated as being manually controlled. However, it is recognized that it may be controlled in other way, i.e. hydraulically, electrically, etc without departing from the essence of the invention.

An accumulator arrangement, such as an accumulator 28, is provided and connected to the first port 14 of the lift actuator 12 by a conduit 30. Even though only one accumulator 28 is illustrated and described, more than one could be used and connected in parallel. The accumulator 28 is operatively connected to the lift actuator 12 so that it remains at the same pressure level as the pressure level in the first port 14 of the lift actuator 12.

A second fluid conduit 32 selectively connects the second port 16 of the actuator 12 with the reservoir 22.

A variable rate ride control system 34 is provided and includes a first valve mechanism, such as an infinitely variable flow control mechanism 36, disposed in the first fluid conduit 30 between the first port 14 of the lift actuator 12 and the accumulator 28, a flow restriction mechanism, such as an orifice 40, and a pilot valve mechanism 42. The first valve mechanism 36 is disposed in the first and second fluid conduits 30,32 between the first and second ports 14,16 of the actuator 12, the reservoir 22 and the accumulator 28 and has a spring biased end 44 and a pressure responsive end 46. The first valve mechanism 36 is movable from a spring biased first position at which the accumulator 28 is in limited fluid communication through the first fluid conduit 30 with the first port 14 of the actuator 12 and the second port 16 of the actuator 12 is blocked from communication through the second fluid conduit 32 with the reservoir 22 towards a second position at which the accumulator 28 is in open communication with the first port 14 of the actuator 12 and the second port 16 of the actuator 12 is in open communication with the reservoir 22.

The flow restriction mechanism 40 is disposed in the first fluid conduit 30 between the first valve mechanism 36 and the first port 14 of the actuator 12 and operative to create a pressure drop thereacross in response to the rate of flow therethrough.

A first signal conduit 50 is connected between the first fluid conduit 30 at a location upstream of the flow restriction mechanism 40 and the pressure responsive end 44 of the first valve mechanism 36. A second signal conduit 52 is connected between the first fluid conduit 30 at a location downstream of the flow restriction mechanism 40 and the spring biased end 44 of the first valve mechanism 36.

The pilot valve mechanism 42 is disposed in the first signal conduit 50 and movable between a spring biased first position at which flow through the first signal conduit 50 is blocked and a second position at which flow therethrough is open. The pilot valve mechanism 42 is movable to the second position in response to an external signal.

Figure 2:
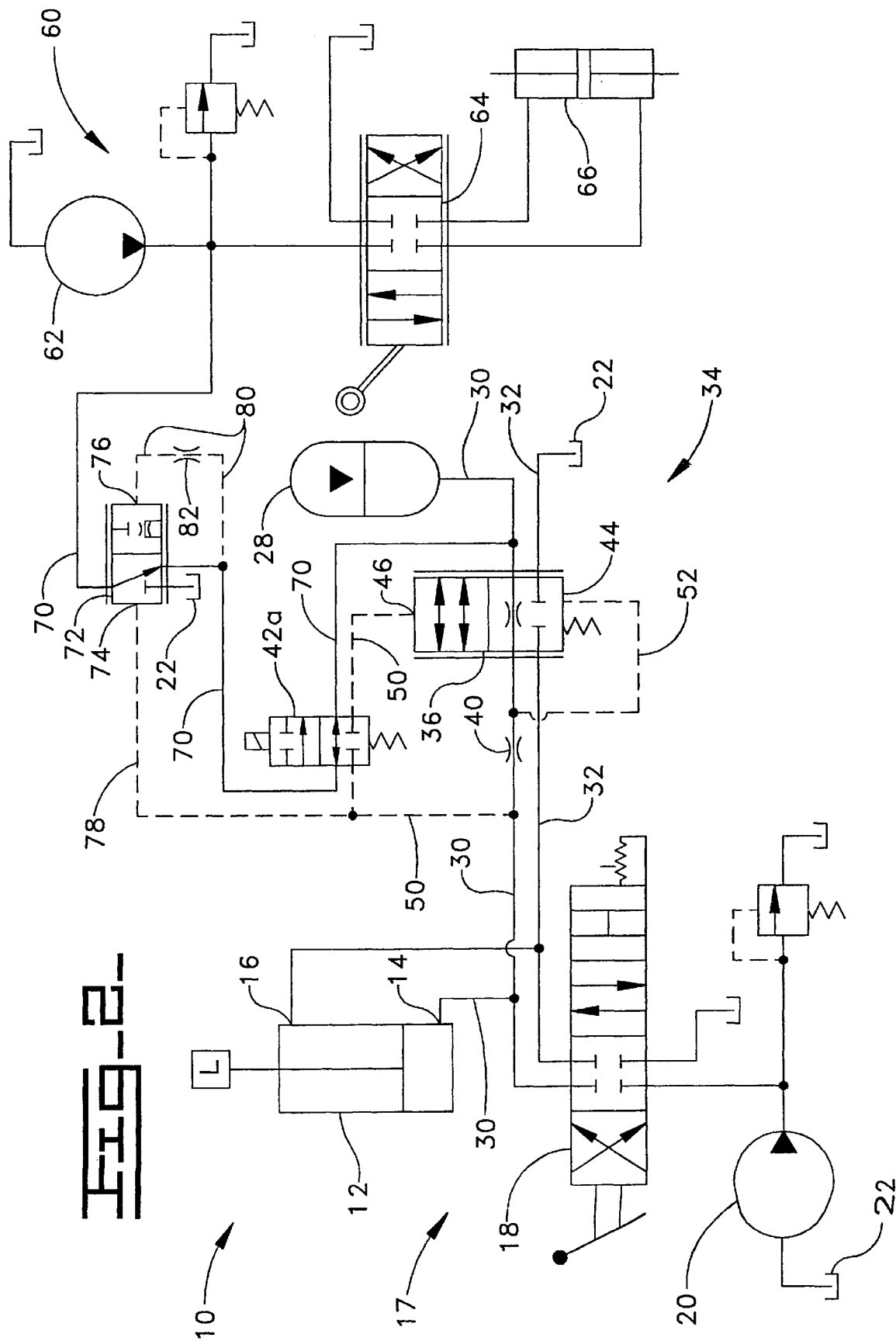
FIG. 2 is a schematic representation of a machine control system incorporating another embodiment of the subject invention in combination with a second fluid circuit.

Referring to FIG. 2 of the drawings, another embodiment of the subject invention is disclosed. Elements of FIG. 2 corresponding to like elements of FIG. 1 have like element numbers. FIG. 2 includes a second fluid circuit 60, such as a steering circuit. The second fluid circuit 60 includes a second source of pressurized fluid 62, a second directional control valve 64, and a second actuator 66.

The variable rate ride control system of FIG. 2 includes a third fluid conduit 70 connected between the second source of pressurized fluid 62 and the accumulator 28. An infinitely variable flow control mechanism 72 is disposed in the third fluid conduit and has a first pressure responsive end 74 and a second pressure responsive end 76. A third signal conduit 78 is connected between the first pressure responsive end 74 of the infinitely variable flow control mechanism 72 and the first signal conduit 50 that is connected to the first fluid conduit 30. A fourth signal conduit 80 is connected between the second pressure responsive end 76 of the infinitely variable flow control mechanism 72 and the third fluid conduit 70 downstream of the infinitely variable flow control mechanism 72. As is well known, a damping orifice 82 is disposed in the fourth signal conduit 80.

A modified pilot valve mechanism 42a is disposed in the first signal conduit 50 and the third fluid conduit 70 of FIG. 2 in place of the pilot valve mechanism 42 that is disposed in the first signal conduit 50 of FIG. 1. The modified pilot valve mechanism 42a is movable between a spring biased first position at which fluid flow through the first signal conduit 50 is blocked and the flow through the third fluid conduit 70 is open and a second position at which fluid flow through the first signal conduit 50 is open and the fluid flow through the third fluid conduit 70 is blocked.

It is recognized that various forms of the subject control system 10 could be utilized without departing from the essence of the invention. For example, the first valve mechanism 36 and the pilot valve mechanism 42 of FIG. 1 could be packaged together into one manifold unit. Likewise, the first valve mechanism 36, the pilot valve mechanism 42a, and the infinitely variable flow control mechanism 72 of FIG. 2 could be packaged together into one manifold unit. Furthermore, even though the second source of pressurized fluid 62 of FIG. 2 is from a steering circuit 60, the second source of pressurized fluid 62 could be from an independent pump or from a brake circuit or any other circuit in the system capable of producing the pressure needed to precharge the accumulator 28 to the level of pressure in the first port 14 of the lift actuator 12.

Industrial Applicability

During loading of the bucket, the operator does not want the cushioning effect of the ride control system. It is desirable to have positive control over the stiffness of the lift actuator 12 while filling the bucket. With reference to FIG. 1, after the bucket is filled and raised to the desired level for travel, in a well known manner, an external signal is directed to the pilot valve mechanism 42 moving it to its second position to activate the ride control system 34. The pressurized fluid in the first fluid conduit 30 is directed through the first signal conduit 50 across the pilot valve mechanism 42 to the pressure responsive end of the first valve mechanism 36 urging the first valve mechanism towards its second position. Since initially the pressure in the first port 14 of the actuator 12 is the same as the pressure in the accumulator 28, the first valve mechanism 36 remains substantially in its first position. In the event the machine encounters a bump or dip in the path being traversed, the load in the bucket reacts by introducing a force into the machine through the actuator 12. This downwardly acting force increase the pressure level in the actuator 12 and at the first port 14 causing fluid to flow from the actuator 12 towards the accumulator 28. The higher pressurized fluid upstream of the flow restriction mechanism 40 acts through the first signal conduit 50 on the pressure responsive end 46 of the first valve mechanism 36 moving it towards its second position against the force of the spring and the force created by the lower pressure level in the first fluid conduit 30 downstream of the flow restriction 40. As long as the resultant force from the pressure differential across the flow restriction 40 remains higher than the force of the spring, the first valve mechanism remains in its second position and the accumulator 28 absorbs the full impact of the shock. As the shock subsides and the differential pressure across the flow restriction 40 lowers, the first valve mechanism 36 moves towards its first position. During this movement of the first valve mechanism 36 towards its first position, fluid flow thereacross is being modulated proportional to the pressure differential across the flow restriction 40.

In the event that a smaller shock load is subjected to the machine during use, the first valve mechanism 36 moves only a portion of the distance from the first position to the second position in order to modulate the flow from the actuator 12 to the accumulator 28. The degree of movement of the first valve mechanism is proportional to the differential pressure across the flow restriction 40. By controlling the rate of flow across the first valve mechanism 36, shock loads of lower magnitudes are more effectively controlled with minimal amounts of bucket bounce due to reaction forces.

During the ride control being active, the operation of FIG. 2 is basically the same as the operation of FIG. 1. The only difference being that in FIG. 2 the pressure level in the accumulator 28 is maintained equal to the pressure level of the load supporting end of the actuator 12 when the ride control is not active. This is accomplished by supplying pressurized fluid from a second source of pressurized fluid 62.

When the ride control is not active, the modified pilot valve mechanism 42a is spring biased to its first position at which fluid flow in the third fluid conduit 70 is free to pass therethrough. The infinitely variable flow control mechanism 72 continuously compares the pressure in the first port 14 of the actuator 12, as sensed through the first signal conduit 50 with the pressure in the accumulator 28, as sensed through the fourth signal conduit 80. If the pressure in the accumulator 28 is lower than the pressure in the first port 14 of the actuator 12, the infinitely variable flow control mechanism 70 moves towards its first position to direct pressurized fluid from the second source of pressurized fluid 62 to the accumulator 28. If the pressure in the accumulator 28 is higher than the pressure in the first port 14, the infinitely variable flow control mechanism 70 moves towards its second position which blocks the second source of pressurized fluid 62 and vent the pressure from the accumulator 28 to the reservoir 22.

The infinitely variable flow control 72 dithers back and forth between its first and second positions depending on the pressure in the first port 14 of the actuator 12 and the pressure in the accumulator 28 to maintain the pressure in the accumulator 28 equal to the pressure in the first port 14 of the actuator 12.

From a review of the above, it should be apparent that the ride control system 34 controls shocks subjected to the machine responsive to the magnitude of the shocks. Additionally, the controls of the ride control system 34 operates in conjunction with a second source of pressurized fluid 62 to control shocks to the machine and to ensure that the pressure in the accumulator 28 is maintained substantially the same as the pressure in the first port 14 of the actuator 12.

Other aspects, objects and advantages of the invention can be obtained from a study of the drawings, the disclosure and the appended claims.

I claim:

1. A variable rate ride control system adapted for use on a machine having a frame with a lift mechanism operative through an actuator to raise a bucket relative to the frame, the actuator having first and second ports and operative to raise and lower the bucket in response to pressurized fluid being selectively directed to and from the respective ports thereof from a fluid circuit having a directional control valve that is connected to a source of pressurized fluid and a reservoir, and an accumulator arrangement connected to the first port of the actuator, the variable rate ride control system comprising:

a first valve mechanism operatively disposed in a fluid conduit between the accumulator arrangement and the first port of the actuator, the first valve mechanism has a spring biased end and a pressure responsive end and is movable from a spring biased first position at which communication is controllably permitted from the accumulator arrangement to the first port of the actuator towards a second position at which there is open communication therethrough;

a flow restriction mechanism disposed in the fluid conduit between the first valve mechanism and the first port of the actuator;

a first signal conduit connected to the fluid conduit at a point between the flow restriction mechanism and the first port of the actuator and to the pressure responsive end of the first valve mechanism;

a second signal conduit connected to the fluid conduit at a point between the flow restriction mechanism and the first valve mechanism and the spring biased end of the first valve mechanism;

a pilot valve mechanism operatively disposed in the first signal conduit and operative to selectively control fluid flow through the first signal conduit, the pilot valve mechanism is movable between a spring biased first position at which the flow through the first signal conduit is blocked and a second position at which the flow therethrough is open, the pilot valve mechanism is movable to the second position in response to receipt of an external signal.

2. The variable rate ride control system of claim 1 including a second fluid conduit connecting the second port of the actuator through the first valve mechanism with the reservoir, in the first position of the first valve mechanism, the flow therethrough is blocked and in the second position thereof the flow therethrough is open.

3. The variable rate ride control system of claim 2 wherein the first valve mechanism is an infinitely variable valve mechanism.

4. The variable rate ride control system of claim 3 wherein the machine includes a second fluid circuit having a second actuator that is connected through a second directional control valve to a second source of pressurized fluid and the reservoir, the variable rate ride control includes a third fluid conduit connecting the second source of pressurized fluid through the pilot valve mechanism to the accumulator arrangement and an infinitely variable flow control mechanism having first and second pressure responsive ends and being disposed in the third fluid conduit between the second source of pressurized fluid and the pilot valve mechanism.

5. The variable rate ride control system of claim 4 wherein the infinitely variable flow control mechanism is controllably movable between a first position at which fluid flow from the second source of pressurized fluid is directed therethrough and a second position at which flow therethrough from the second source of pressurized fluid is blocked and the pressurized fluid downstream thereof is connected to the reservoir.

6. The variable rate ride control system of claim 5 including a third signal conduit connected between the first pressure responsive end of the infinitely variable flow mechanism and the first fluid conduit upstream of the flow restriction mechanism and a fourth signal conduit connected between the second pressure responsive end of the infinitely variable flow control mechanism and the third fluid conduit downstream of the infinitely variable flow control mechanism.

7. The variable rate ride control system of claim 6 wherein in the first position of the pilot valve mechanism flow in the third fluid conduit freely passes therethrough and in the second position thereof the flow in the third fluid conduit is blocked from passing therethrough.

8. The variable rate ride control system of claim 7 wherein the second circuit is a steering circuit.

* * * * *